United States Patent
Gao et al.

(10) Patent No.: US 12,490,242 B2
(45) Date of Patent: Dec. 2, 2025

(54) COMMUNICATION METHOD AND COMMUNICATION APPARATUS

(71) Applicant: Huawei Technologies Co., Ltd., Shenzhen (CN)

(72) Inventors: Lei Gao, Beijing (CN); Jiezuo Zhu, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 388 days.

(21) Appl. No.: 17/976,359

(22) Filed: Oct. 28, 2022

(65) Prior Publication Data

US 2023/0056703 A1    Feb. 23, 2023

Related U.S. Application Data

(63) Continuation of application No. PCT/CN2020/087859, filed on Apr. 29, 2020.

(51) Int. Cl.
*H04W 72/0446* (2023.01)
*H04L 27/26* (2006.01)
*H04W 56/00* (2009.01)

(52) U.S. Cl.
CPC ..... *H04W 72/0446* (2013.01); *H04L 27/2607* (2013.01); *H04W 56/001* (2013.01)

(58) Field of Classification Search
CPC ............ H04W 72/0446; H04W 56/001; H04L 27/2607
See application file for complete search history.

(56) References Cited

U.S. PATENT DOCUMENTS

| | | | |
|---|---|---|---|
| 2017/0264401 A1 | 9/2017 | Soong et al. | |
| 2018/0049066 A1 | 2/2018 | Nory et al. | |
| 2018/0062801 A1* | 3/2018 | Zhang | H04J 11/0053 |
| 2018/0213494 A1 | 7/2018 | Lu et al. | |
| 2019/0334680 A1 | 10/2019 | Li et al. | |
| 2019/0349170 A1 | 11/2019 | Li et al. | |
| 2019/0349872 A1* | 11/2019 | Harada | H04L 27/26 |
| 2020/0084773 A1 | 3/2020 | Li et al. | |

FOREIGN PATENT DOCUMENTS

| | | | | |
|---|---|---|---|---|
| CN | 108347778 A | | 7/2018 | |
| CN | 108810983 A | | 11/2018 | |
| CN | 109417754 A | * | 3/2019 | ......... H04L 27/2602 |
| CN | 107534545 B | * | 5/2021 | ......... H04L 1/0046 |
| KR | 20160063282 A | | 6/2016 | |
| WO | WO-2017136056 A1 | * | 8/2017 | ......... H04L 1/0046 |
| WO | 2018202001 A1 | | 11/2018 | |
| WO | 2019009619 A1 | | 1/2019 | |

* cited by examiner

*Primary Examiner* — Saad A. Waqas
(74) *Attorney, Agent, or Firm* — Conley Rose, P.C.

(57) ABSTRACT

A communication method includes receiving, by a first time domain resource, a first signal for synchronization and receiving, by at least one second time domain resource, a first message comprising one or both of cyclic prefix length information and resource configuration information for uplink transmission and downlink transmission, wherein a length of a time interval between the first time domain resource and each of the at least one second time domain resource is a positive-integer number of time domain resource units.

32 Claims, 6 Drawing Sheets

COMMUNICATION METHOD AND COMMUNICATION APPARATUS

CROSS-REFERENCE TO RELATED APPLICATIONS

This is a continuation of International Patent Application No. PCT/CN2020/087859 filed on Apr. 29, 2020, the disclosure of which is hereby incorporated by reference in its entirety.

TECHNICAL FIELD

This application relates to the communication field, and more specifically, to a communication method and a communication apparatus in the communication field.

BACKGROUND

As communication becomes more diversified, various communication apparatuses emerge. Transmission distances of transmission links between different communication apparatuses are different, and transmission delays are different when transmission distances are different. For a transmission link with a high delay, a long cyclic prefix (CP) is required between two communication apparatus to ensure performance of the link. For a transmission link with a low delay, a short CP is required between communication apparatuses to improve spectrum efficiency. For example, in the Internet of Vehicles, a delay of a transmission link between two communication apparatuses in a small vehicle is low, and therefore a short CP is required between the two communication apparatuses to improve spectrum efficiency. A delay of a transmission link between two communication apparatuses in a large vehicle is high, and therefore a long CP is required between the two communication apparatuses to ensure link performance. In addition, in different scenarios, service volumes of uplink transmission and downlink transmission are different, performance requirements for an uplink and a downlink are different, and transmit power of uplink transmission and transmit power of downlink transmission are also different. In a design process, different resources need to be configured for uplink transmission and downlink transmission in different scenarios, to improve spectrum efficiency.

In the conventional technologies, a communication apparatus needs to determine a CP length by blind detection, and also needs to determine, by blind detection, resource configuration for uplink transmission and downlink transmission. As a result, blind detection is frequent and complex. This affects system performance.

SUMMARY

This application provides a communication method and a communication apparatus, to reduce signaling overheads and improve system performance.

According to a first aspect, a communication method is provided. The method may be performed by a first communication apparatus. The first communication apparatus may be a communication device or a communication apparatus that can support the communication device in implementing a function required in the method, for example, a chip system. For example, the method includes receiving a first signal on a first time domain resource, where the first signal is used for synchronization; and receiving a first message on at least one second time domain resource, where the first message includes cyclic prefix length information and/or resource configuration information for uplink transmission and downlink transmission, where a length of a time interval between the first time domain resource and each of the at least one second time domain resource is a positive-integer number of time domain resource units.

In the foregoing method, if the length of the time interval between the first time domain resource used by the first communication apparatus to receive the first signal and the at least one second time domain resource used by the first communication apparatus to receive the first message is a positive-integer number of time domain resource units, the first communication apparatus can determine the at least one second time domain resource based on the length of the time interval and the first time domain resource, and therefore obtain the cyclic prefix length information and/or the resource configuration information for uplink transmission and downlink transmission from the first message. Blind detection required for obtaining cyclic prefix length information and/or resource configuration information for uplink transmission and downlink transmission can be avoided. This reduces complexity, and improves efficiency of detecting the CP length information and/or the resource configuration information by the first communication apparatus, thereby improving system performance.

In some possible implementations, a length of the time domain resource unit is fixed. In addition, when there are different pieces of CP length information and/or resource configuration information for uplink transmission and downlink transmission, the time domain resource unit is still a transmission granularity with a fixed length.

It may be understood that the time domain resource unit may be a frame, a subframe, a superframe, a timeslot, or the like.

It should be noted that if there are a plurality of second time domain resources, time intervals between the first time domain resource and the plurality of second time domain resources may be different, and time intervals between two adjacent second time domain resources in the plurality of second time domain resources may be the same or different.

The length of the time interval between the first time domain resource and each of the at least one second time domain resource being a positive-integer number of time domain resource units may be explained as follows. A position of the first time domain resource relative to a boundary of a first time domain unit is the same as a position of the second time domain resource relative to a boundary of a second time domain unit, where the first time domain resource is located in the first time domain unit, and the second time domain resource is located in the second time domain unit. The boundary may be a left boundary or a right boundary.

The length of the time interval between the first time domain resource and each of the at least one second time domain resource being a positive-integer number of time domain resource units may alternatively be explained as a time domain position of the first time domain resource in the first time domain resource unit is the same as a time domain position of the second time domain resource in the second time domain resource unit, where a structure of the first time domain resource unit is the same as that of the second time domain resource unit.

The structure of the first time domain resource unit being the same as that of the second time domain resource unit may be explained as a quantity of time domain resources for uplink transmission in the first time domain resource unit is the same as that in the second time domain resource unit, for example, quantities of symbols for uplink transmission are the same; a quantity of time domain resources for downlink transmission in the first time domain resource unit is the same as that in the second time domain resource unit, for example, quantities of symbols for downlink transmission are the same; or a quantity of time domain resources for downlink transmission and a quantity of time domain resources for transmission performed last time in the first time domain resource unit are the same as those in the second time domain resource unit, for example, quantities of symbols for uplink transmission are the same, and quantities of symbols for downlink transmission are the same.

In the foregoing solution, uplink transmission is sending data or a signal from a secondary node to a primary node; and downlink transmission is sending data or a signal from a primary node to a secondary node. The primary node manages the secondary node and has a resource allocation function, and allocates a resource to the secondary node. The secondary node is subject to scheduling of the primary node, and uses the resource allocated by the primary node to communicate with the primary node. For example, the primary node is a network device, and the secondary node is a terminal device. For another example, the primary node is a mobile phone, and the secondary node is a headset.

In some possible implementations, the first message includes a first field, and the first field indicates the cyclic prefix length information.

In some possible implementations, the first message includes a first field, and the first field indicates the resource configuration information.

In some possible implementations, the first message includes a first field, and the first field indicates the cyclic prefix length information and the resource configuration information. In this way, the cyclic prefix length information and the resource configuration information can both be indicated by the first field, thereby reducing signaling overheads.

In some possible implementations, preset correspondences exist between different values indicated by the first field and different pieces of cyclic prefix length information and/or resource configuration information.

In some possible implementations, the preset correspondence may be specified or configured by a protocol.

In some possible implementations, the first signal is further used to indicate a length of a time interval between the first time domain resource and the at least one second time domain resource. In other words, the first signal is further used to indicate the positive-integer number of time domain resource units. In this way, the first communication apparatus may determine the at least one second time domain resource based on the length of the time interval in the first signal and the first time domain resource on which the first signal is received.

In some possible implementations, a protocol may specify the length of the time interval between the first time domain resource and the at least one second time domain resource.

In some possible implementations, the first message is a broadcast message.

In some possible implementations, the broadcast message is a system message.

According to a second aspect, a communication method is provided. The method may be performed by a second communication apparatus. The second communication apparatus may be a communication device or a communication apparatus that can support the communication device in implementing a function required in the method, for example, a chip system. For example, the method includes: sending a first signal on a first time domain resource, where the first signal is used for synchronization; and sending a first message on at least one second time domain resource, where the first message includes cyclic prefix length information and/or resource configuration information for uplink transmission and downlink transmission, where a length of a time interval between the first time domain resource and each of the at least one second time domain resource is a positive-integer number of time domain resource units.

In the foregoing method, if the length of the time interval between the first time domain resource used by the first communication apparatus to receive the first signal and the at least one second time domain resource used by the first communication apparatus to receive the first message is a positive-integer number of time domain resource units, the first communication apparatus can determine the at least one second time domain resource based on the length of the time interval and the first time domain resource, and therefore obtain the cyclic prefix length information and/or the resource configuration information for uplink transmission and downlink transmission from the first message. Signaling overheads caused by blind detection required for obtaining the cyclic prefix length information and/or the resource configuration information for uplink transmission and downlink transmission can be avoided. This improves system performance.

In some possible implementations, the first message includes a first field, and the first field indicates the cyclic prefix length information.

In some possible implementations, the first message includes a first field, and the first field indicates the resource configuration information.

In some possible implementations, the first message includes a first field, and the first field indicates the cyclic prefix length information and the resource configuration information. In this way, the cyclic prefix length information and the resource configuration information can both be indicated by the first field, thereby reducing bit overheads. If the resource configuration information indicates a ratio of a quantity of symbols for uplink transmission to a quantity of symbols for downlink transmission, because the cyclic prefix length information and the resource configuration information are associated, bit overheads can be reduced by implementing combined indication.

In some possible implementations, preset correspondences exist between different values indicated by the first field and different pieces of cyclic prefix length information and/or resource configuration information.

In some possible implementations, the first signal is further used to indicate a length of a time interval between the first time domain resource and the at least one second time domain resource.

In some possible implementations, the first message is a broadcast message.

In some possible implementations, the broadcast message is a system message.

According to a third aspect, a communication apparatus is provided. The communication apparatus is configured to perform the method in any one of the first aspect or the possible implementations of the first aspect. Further, the communication apparatus may include modules configured to perform the method in any one of the first aspect or the possible implementations of the first aspect.

According to a fourth aspect, a communication apparatus is provided. The communication apparatus is configured to perform the method in any one of the second aspect or the possible implementations of the second aspect. Further, the communication apparatus may include modules configured to perform the method in any one of the second aspect or the possible implementations of the second aspect.

According to a fifth aspect, a communication apparatus is provided. The communication apparatus includes a processor, and the processor is coupled to a memory. The memory is configured to store a computer program or instructions. The processor is configured to execute the computer program or the instructions stored in the memory, so that the method in the first aspect is performed.

For example, the processor is configured to execute the computer program or the instructions stored in the memory, so that the apparatus performs the method in the first aspect.

Optionally, the communication apparatus includes one or more processors.

Optionally, the communication apparatus may further include the memory coupled to the processor.

Optionally, the communication apparatus includes one or more memories.

Optionally, the memory may be integrated with the processor, or the memory and the processor are disposed separately.

Optionally, the communication apparatus may further include a transceiver.

According to a sixth aspect, a communication apparatus is provided. The communication apparatus includes a processor, and the processor is coupled to a memory. The memory is configured to store a computer program or instructions. The processor is configured to execute the computer program or the instructions stored in the memory, so that the method in the second aspect is performed.

For example, the processor is configured to execute the computer program or the instructions stored in the memory, so that the communication apparatus performs the method in the second aspect.

Optionally, the communication apparatus includes one or more processors.

Optionally, the communication apparatus may further include the memory coupled to the processor.

Optionally, the communication apparatus includes one or more memories.

Optionally, the memory may be integrated with the processor, or the memory and the processor are disposed separately.

Optionally, the communication apparatus may further include a transceiver.

According to a seventh aspect, this application provides a communication system, where the communication system includes the apparatus provided in the third aspect and the apparatus provided in the fourth aspect; or the system includes the apparatus provided in the fifth aspect and the apparatus provided in the sixth aspect.

According to an eighth aspect, a computer-readable storage medium is provided. The computer-readable storage medium stores a computer program (which may also be referred to as an instruction or code) used to implement the method in the first aspect.

For example, when the computer program is executed by a computer, the computer is enabled to perform the method in the first aspect. The computer may be a communication apparatus.

According to a ninth aspect, a computer-readable storage medium is provided. The computer-readable storage medium stores a computer program (which may also be referred to as an instruction or code) used to implement the method in the first aspect or the second aspect.

For example, when the computer program is executed by a computer, the computer is enabled to perform the method in the second aspect. The computer may be a communication apparatus.

According to a tenth aspect, this application provides a chip including a processor. The processor is configured to read and execute a computer program stored in a memory, to perform the method in any one of the first aspect and the possible implementations of the first aspect.

Optionally, the chip further includes a memory, and the memory and the processor are connected by a circuit or a wire.

Optionally, the chip further includes a communication interface.

According to an eleventh aspect, this application provides a chip system including a processor. The processor is configured to read and execute a computer program stored in a memory, to perform the method in any one of the second aspect and the possible implementations of the second aspect.

Optionally, the chip further includes a memory, and the memory and the processor are connected by a circuit or a wire.

Optionally, the chip further includes a communication interface.

According to a twelfth aspect, this application provides a computer program product, where the computer program product includes a computer program (which may also be referred to as an instruction or code). When the computer program is executed by a computer, the computer is enabled to perform the method in the first aspect. The computer may be a communication apparatus.

According to a thirteenth aspect, this application provides a computer program product, where the computer program product includes a computer program (which may also be referred to as an instruction or code). When the computer program is executed by a computer, the computer is enabled to perform the method in the second aspect. The computer may be a communication apparatus.

DESCRIPTION OF EMBODIMENTS

Figure 1:
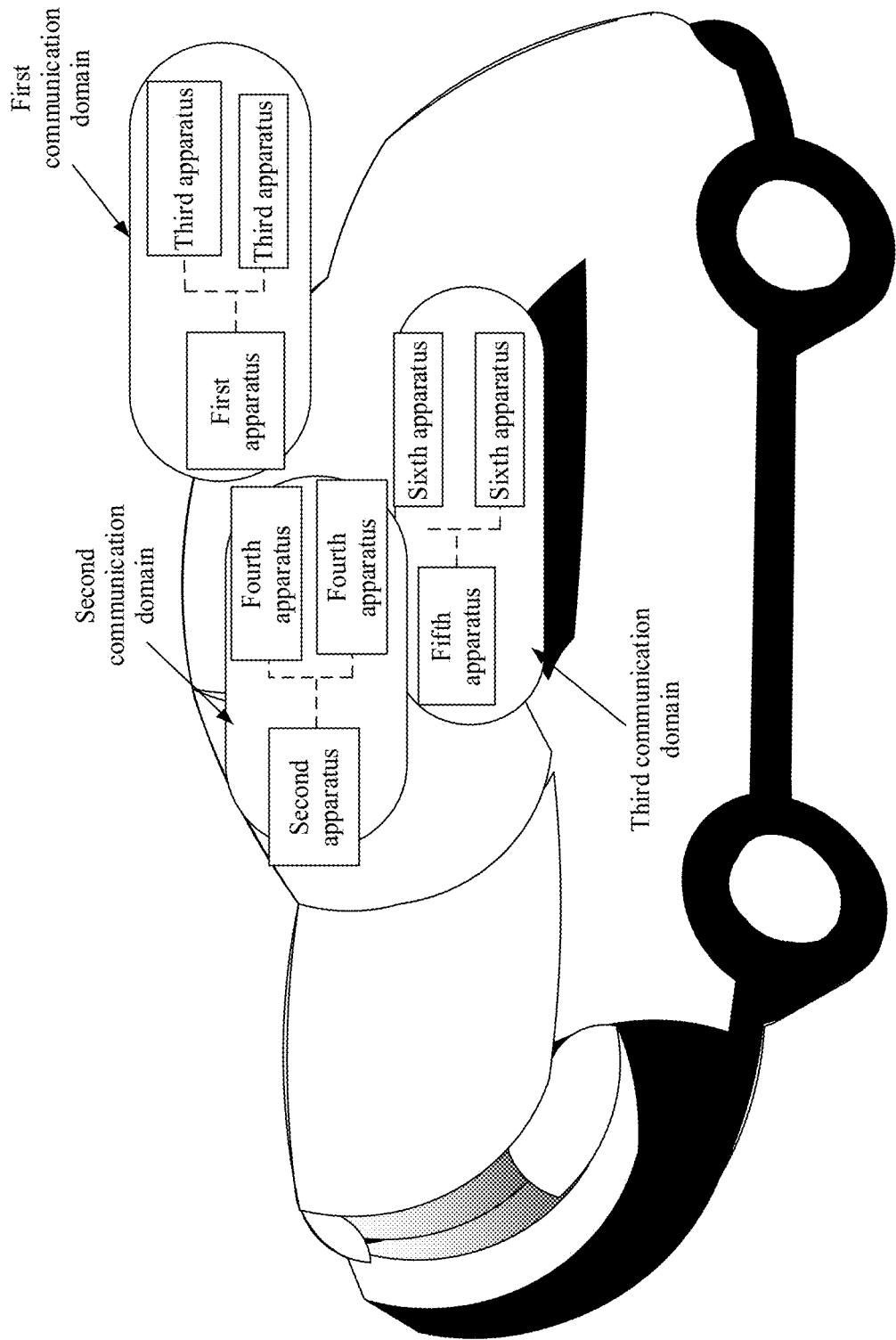
FIG. 1 is a schematic diagram of an application scenario-based architecture according to an embodiment of this application.

The following describes technical solutions in embodiments of this application with reference to accompanying drawings in embodiments of this application.

In the specification, claims, and the accompanying drawings of this application, the terms "first", "second", "third", "fourth" and the like (if the terms exist) are intended to distinguish between similar objects but do not indicate a particular order or a sequence. It should be understood that data termed in this way is interchangeable in a proper circumstance, so that embodiments of this application described herein can be implemented in an order other than an order illustrated or described herein. In addition, the terms "include", "have", and any other variants mean to cover non-exclusive inclusion, for example, a process, method, system, product, or device that includes a list of steps or units is not necessarily limited to those expressly listed steps and units, but may include other steps or units not expressly listed or inherent to such a process, method, product, or device.

A communication device in embodiments of this application may be an in-vehicle device such as a head unit, an in-vehicle speaker, or an in-vehicle microphone, or may be an electronic device such as a mobile phone, a tablet computer, a desktop computer, a laptop, a notebook computer, an ultra-mobile personal computer (UMPC), a handheld computer, a netbook, a personal digital assistant (PDA), a wearable electronic device, or a virtual reality device.

Some terms in this application are first described, so that a person skilled in the art has a better understanding.

(1) Cockpit Domain Controller or Control Domain Cockpit (CDC) is briefly referred to as a head unit. Currently, in addition to conventional functions such as playing radio programs, playing music and videos, and navigation, the head unit has a cellular communication function (third generation (3G), fourth generation (4G), and the like). By using a Controller Area Network (CAN) bus technology, the head unit can implement human-vehicle information communication and vehicle-to-everything information communication. This improves user experience and services, and enhances security functions.

(2) Primary node and secondary node: Based on logical functions, nodes are classified into two types: primary node and secondary node. The primary node manages the secondary node and has a resource allocation function. The primary node allocates a resource to the secondary node. The secondary node is subject to scheduling of the primary node and uses the resource allocated by the primary node to communicate with the primary node. The nodes may be various apparatuses. For example, the primary node is a mobile phone, and the secondary node is a headset. A communication connection is established between the mobile phone and the headset to implement data exchange. The mobile phone manages the headset. The mobile phone has a resource allocation function and can allocate a resource to the headset.

(3) Communication domain: A communication domain is a system composed of a group of communication nodes having communication relationships, and the communication connection relationships between the communication nodes. Further, a communication domain is a system including a primary node, at least one secondary node, and a communication relationship between the primary node and the at least one secondary node. One apparatus or device may be in a plurality of communication domains. For example, when a mobile phone performs wireless communication with a headset, the mobile phone is in a communication domain a that includes the mobile phone and the headset, where the mobile phone is a primary node, and the headset is a secondary node in the communication domain a. After the mobile phone detects a CDC and establishes a wireless connection with the CDC, the mobile phone is also in a communication domain b that includes the mobile phone and the CDC, where the CDC is a primary node in the communication domain b, the mobile phone is a secondary node, and the mobile phone is subject to scheduling of the CDC. The communication domain b may further include another secondary node, for example, an in-vehicle sound box or a microphone.

(4) External node: A node that does not belong to a communication domain is an external node of the communication domain. The external node includes a device that has never joined the communication domain, and a device that joined the communication domain and then quits the communication domain. The external node may be converted into a secondary node of the communication domain in a process of joining the communication domain. The process in which the external node joins the communication domain mainly includes three steps: communication domain search and synchronization, obtaining system information of the communication domain, and registering and obtaining configuration information. In the step of communication domain search and synchronization, the external node detects a synchronization signal sent by a primary node in the communications domain, and performs synchronization based on the detected synchronization signal.

(5) Uplink transmission: A secondary node sends data or a signal to a primary node.

(6) Downlink transmission: A primary node sends data or a signal to a secondary node.

(7) Time domain resource unit: A time domain resource unit may also be referred to as a time domain time unit, and may be a frame, a subframe, a superframe, a timeslot, or the like.

A wireless communication scenario in a communication method provided in embodiments of this application may include an in-vehicle wireless communication scenario in FIG. 1, for example, communication between a CDC and an in-vehicle sound box, an in-vehicle microphone, or a mobile phone, and communication between a mobile phone and a wearable device such as a headset. Local wireless communication may be further included, for example, communication between a plurality of access points (APs) and a plurality of stations may be included. Wide area wireless communication shown in FIG. 2 may also be included, for example, communication between a plurality of base stations and user equipments (UEs), where the base station serves as a primary node, the UE serves as a secondary node, the base station allocates a resource to the UE, and the UE is subject to scheduling of the base station.

The method provided in the embodiments may be applied to a communication system, for example, in-vehicle communication, in-vehicle wireless communication, cockpit communication, cockpit wireless communication, cockpit domain communication, cockpit domain wireless communication, and vehicle-to-everything (V2X), Long-Term Evolution-Vehicle (LTE-V) wireless communication, vehicle-to-vehicle (V2V), internet of vehicles (IoV), machine type communications (MTC), internet of things IoT), machine-to-machine (M2M), and LTE-M2M (LTE-M).

To facilitate understanding of the communication method in embodiments of this application, an in-vehicle wireless communication scenario is used as an example for the following description. However, the communication method in embodiments of this application is not limited to the in-vehicle communication scenario.

FIG. 1 is a schematic diagram of a scenario-based architecture to which a communication method according to an embodiment of this application is applied. The scenario may include but is not limited to a first apparatus, a second apparatus, a third apparatus, and a fourth apparatus. The first apparatus may be a mobile phone. The second apparatus may be a CDC. The third apparatus may include a plurality of wearable devices such as a headset and a wristband. The fourth apparatus may also include a plurality of devices such as an in-vehicle sound box and an in-vehicle microphone. It can be learned from the above descriptions that the first apparatus and the second apparatus are different. In some possible scenarios, the first apparatus and the second apparatus may be of a same type, for example, both are CDCs, but the first apparatus and the second apparatus represent different CDCs.

The second apparatus may be a device that performs control and management such as allocation and coordination of communication resources in an in-vehicle wireless communication scenario. The second apparatus establishes a communication connection with at least one fourth apparatus to form a second communication domain. The first apparatus establishes a communication connection with at least one third apparatus to form a first communication domain.

In a possible implementation, the scenario-based architecture in this embodiment of this application may further include a communication domain including more apparatuses, for example, a fifth apparatus and a sixth apparatus. This is not limited in this application.

The first apparatus, the second apparatus, and the fifth apparatus may be respective primary nodes in three communication domains. The third apparatus, the fourth apparatus, and the sixth apparatus may be respective secondary nodes in the three communication domains.

To facilitate understanding of the communication method in embodiments of this application, a wide area wireless communication scenario is used as an example for the following description. However, the communication method in embodiments of this application is not limited to the in-vehicle communication scenario.

Figure 2:
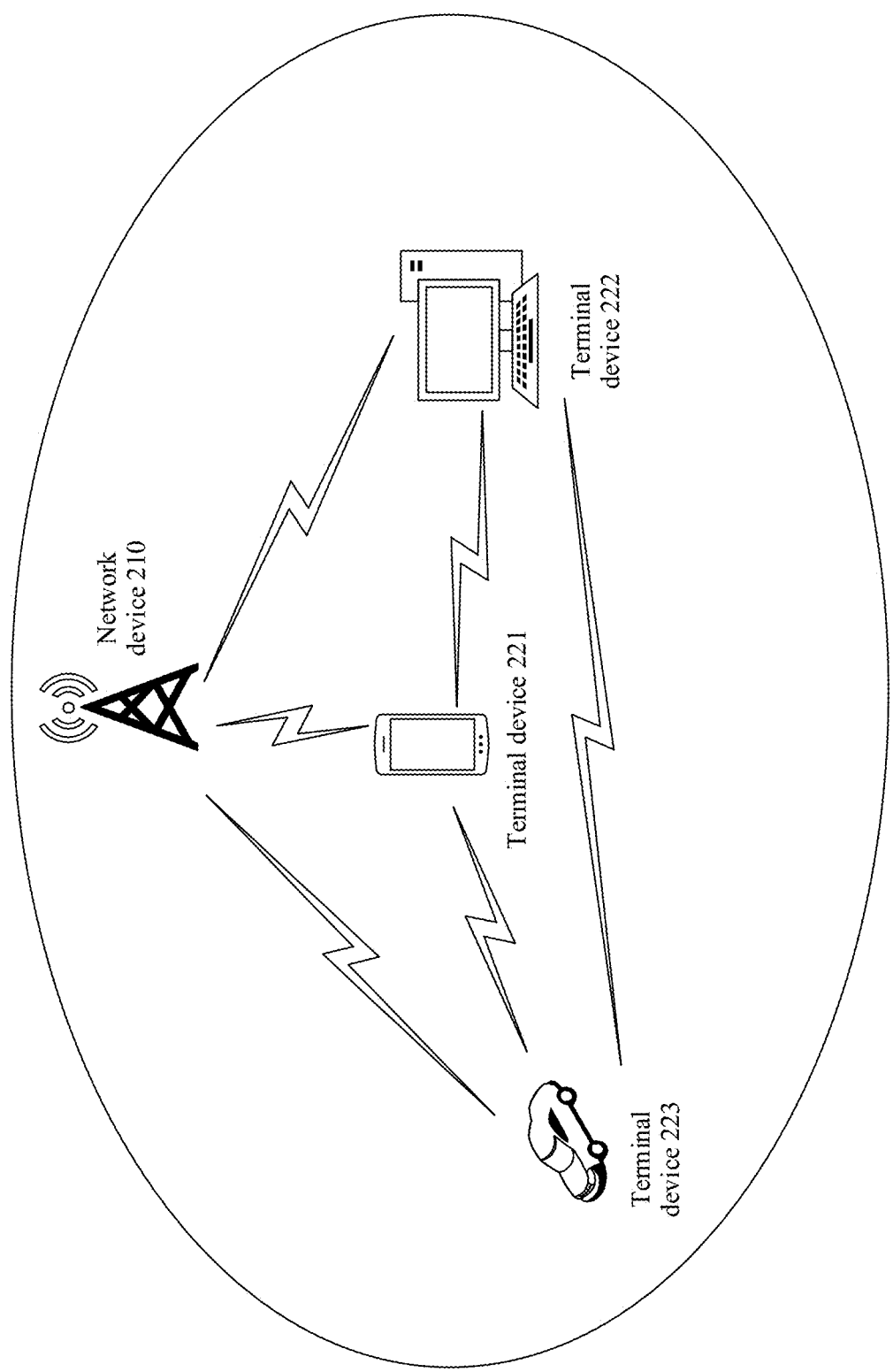
FIG. 2 is a schematic diagram of another application scenario-based architecture according to an embodiment of this application.

FIG. 2 is a schematic diagram of another scenario-based architecture to which a communication method according to an embodiment of this application is applied. As shown in FIG. 2, any two of a network device 210, a terminal device 221, a terminal device 222, and a terminal device 223 may exchange data. The network device 210 may allocate a resource to any one of the terminal devices 221 to 223, and any one of the terminal devices 221 to 223 is subject to scheduling performed by the network device 210. In this case, the network device 210 may be referred to as a primary node, and any one of the terminal devices 221 to 223 may be referred to as a secondary node. Optionally, in the terminal devices 221 to 223, there may be one primary node that controls two remaining secondary nodes. For example, the terminal device 222 may be used as a primary node to control the two secondary nodes: the terminal device 221 and the terminal device 222.

A terminal device (for example, the terminal devices 221 to 223 in FIG. 2) in embodiments of this application may be UE, a mobile station (MS), a mobile terminal (MT), an access terminal, a subscriber unit, a subscriber station, a mobile station, a remote station, a remote terminal, a mobile device, a user terminal, a terminal, a wireless communication apparatus, a user agent, a user apparatus, or the like.

The terminal device is a device that provides voice/data connectivity for a user, for example, a handheld device or an in-vehicle device that has a wireless connection function. For example, the terminal device may be a mobile phone, a tablet computer, a laptop computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in smart grid, a wireless terminal in transportation safety, a wireless terminal in smart city, a wireless terminal in smart home, a cellular phone, a cordless telephone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, a terminal device in a fifth generation (5G) network, or a terminal device in a future evolved public land mobile network (PLMN). This is not limited in embodiments of this application.

As an example rather than a limitation, in embodiments of this application, the terminal device may alternatively be a wearable device. The wearable device may alternatively be referred to as wearable intelligent device, and is a generic term for wearable devices such as glasses, gloves, watches, clothes, and shoes that are developed based on intelligent design of daily wearing by using wearable technologies. The wearable device is a portable device that can be directly worn on a body or integrated into a cloth or an accessory of a user. The wearable device is a hardware device, and implements powerful functions through software support, data exchange, and cloud interaction. In a broad sense, the wearable includes a device that provides a complete function, has a large size, and can implement all or some functions without relying on a smartphone, for example, a smart watch or smart glasses; and includes a device that focuses only on a specific type of application and needs to be used in combination with another device such as a smartphone, for example, various smart bands and smart jewelry used for vital sign monitoring.

In addition, in embodiments of this application, the terminal device may alternatively be a terminal device in an IoT system. The IoT is an important part of future development of information technologies. A main technical feature of the IoT is to connect an object and a network by using a communication technology, to build an intelligent network characterized by human-machine connection and connection between all things. Alternatively, the terminal device in this application may be an in-vehicle module, an in-vehicle module, an in-vehicle component, an in-vehicle chip, or an in-vehicle unit that is built in a vehicle as one or more components or units. The vehicle may implement the method in this application by using the built-in in-vehicle module, the in-vehicle module, the in-vehicle component, the in-vehicle chip, or the in-vehicle unit.

A network device (for example, the network device 210 in FIG. 2) in embodiments of this application may be referred to as a base station. The base station may be in a plurality of forms, for example, a macro base station, a micro base station, a relay station, or an access point. For example, the network device may be an evolved NodeB (eNB) in an LTE system, a next generation NodeB (gNB) in a 5G system, or a transmission reception point (TRP).

It may be understood that the application scenarios shown in FIG. 1 and FIG. 2 are merely used to clearly describe the technical solutions of this application, and do not constitute any limitation on this application. A person of ordinary skill in the art may learn that, with evolution of network architectures and emergence of new service scenarios, the technical solutions provided in embodiments of this application are also applicable to a similar technical problem.

Transmission distances of transmission links in different communication domains shown in FIG. 1 and FIG. 2 are different, and delays are different when transmission distances are different. For a transmission link with a high delay, a long CP is required between two nodes to ensure transmission performance of the link. For a transmission link with a low delay, a short CP is required between two nodes to improve spectrum efficiency. In addition, in different communication domains, service volumes of uplink transmission and downlink transmission are different, performance requirements for an uplink and a downlink are different, and transmit power of uplink transmission and transmit power of downlink transmission are also different. In a design process, different resources need to be configured for uplink transmission and downlink transmission in different communication domains, to improve spectrum efficiency. In the conventional technology, a secondary node needs to determine a CP length by blind detection, and also needs to determine, by blind detection, resource configuration for uplink transmission and downlink transmission. As a result, blind detection is frequent and complex. This affects system performance.

In view of this, embodiments of this application provide a communication method and a communication apparatus. When a first communication apparatus (for example, may be a secondary node) used as an external node is to join a communication domain in which a second communication apparatus (for example, may be a primary node) is located, the second communication apparatus may send, on a first time domain resource, a first signal used for synchronization. When different pieces of CP length information and/or resource configuration information for uplink transmission and downlink transmission are used, a length of a time interval between a first time domain resource used by the second communication device to send the first signal and at least one second resource used by the second communication apparatus to send the first message remains the same. The first message includes CP length information and/or resource configuration information for uplink transmission and downlink transmission. When any CP length information and/or any resource configuration information are/is used, the first communication apparatus may obtain a position of the at least one second time domain resource after synchronization based on the first signal, to receive the first message on the at least one second time domain resource. The first communication apparatus can determine, based on the first message, CP length information and/or resource configuration information of the communication domain in which the second communication apparatus serves as the primary node. This can avoid blind detection, thereby reducing complexity, and improving efficiency of detecting the CP length information and/or the resource configuration information by the first communication apparatus. In this way, system performance can be improved.

Figure 3:
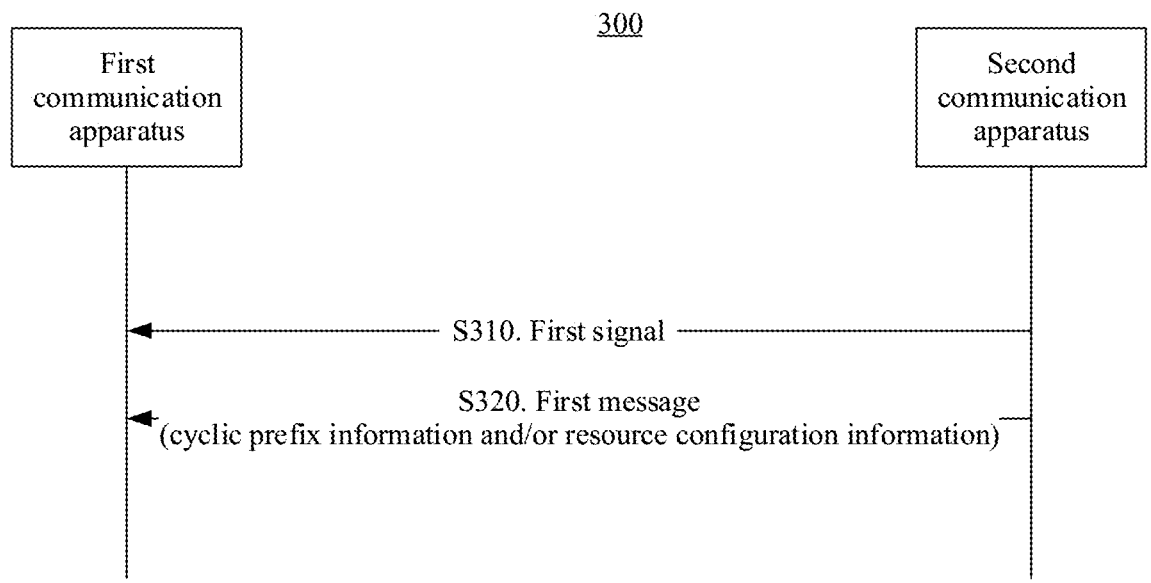
FIG. 3 is a schematic diagram of a communication method according to an embodiment of this application.

The following describes a communication method according to an embodiment of this application. As shown in FIG. 3, a second communication apparatus in FIG. 3 may be the foregoing primary node, and a first communication apparatus may be the foregoing secondary node. The method 300 includes the following steps.

S310. The second communication apparatus sends a first signal on a first time domain resource, and the first communication apparatus receives the first signal sent by the second communication apparatus on the first time domain resource, where the first signal is used for synchronization.

Optionally, the second communication apparatus may broadcast or multicast the first signal on the first time domain resource, and the first communication apparatus may receive the first signal by blind detection.

Optionally, the first signal may be a synchronization signal, for example, may include a primary synchronization signal (PSS) and/or a secondary synchronization signal (SSS). The PSS and the SSS are used to perform downlink synchronization, including timing synchronization, frame synchronization, and symbol synchronization. The PSS and the SSS are further used to obtain a cell identity (ID) and measure cell signal quality.

S320. The second communication apparatus sends a first message on at least one second time domain resource, and the first communication apparatus receives, on the at least one second time domain resource, the first message sent by the second communication apparatus, where the first message includes CP length information and/or resource configuration information for uplink transmission and downlink transmission.

Optionally, the first message may be a broadcast message, for example, may be a system message. The system message is a broadcast or multicast message used to indicate resource configuration of a system (or a communication domain). For example, the system message may be a message carried in a system information block (SIB) or a message carried in a master system information block (MIB). Optionally, the second communication apparatus may send the system message on a physical broadcast channel (PBCH).

Optionally, the CP length information may indicate a CP length value, or may indicate an index of a CP length value, or may indicate a difference between a CP length value of current transmitted data and a length value of historical transmitted data or an index of the difference, or the like. The CP length information is not limited in this embodiment of this application.

Optionally, the resource configuration information may indicate resource configuration for uplink transmission and downlink transmission in one time domain resource unit. For example, the resource configuration information may indicate a ratio of a quantity of time-domain resources for uplink transmission to a quantity of time domain resources for downlink transmission in a time domain resource unit or an index of the ratio. The resource configuration information may indicate a quantity of time domain resources for uplink transmission and a position of the time domain resource, and a quantity of time domain resources for downlink transmission and a position of the time domain resource in a time domain resource unit. The resource configuration information may indicate a difference (or an index of the difference) between a quantity of time domain resources for current uplink transmission and a quantity of time domain resources for uplink transmission performed last time, and a difference (or an index of the difference) between a quantity of time domain resources for current downlink resource and a quantity of time domain resources for downlink transmission performed last time in a time domain resource unit. The resource configuration information may indicate an offset (or an index of the offset) of a position of a time domain resource for current uplink transmission relative to a position of a time domain resource for uplink transmission performed last time, and a difference (or an index of the difference) between a quantity of time domain resources for current uplink transmission and a quantity of time domain resources for uplink transmission performed last time in a time domain resource unit, and indicate an offset (or an index of the offset) of a position of a time domain resource for current downlink transmission relative to a position of a time domain resource for downlink transmission performed last time, and a difference (or an index of the difference) between a quantity of time domain resources for current downlink transmission and a quantity of time domain resources for downlink transmission performed last time in the time domain resource unit.

In this embodiment of this application, a length of a time interval between the first time domain resource and the at least one second time domain resource remains the same when different pieces of cyclic prefix length information and/or different pieces of resource configuration information for uplink transmission and downlink transmission are used. In other words, regardless of changes of the CP length information and/or the resource configuration information, a relative position relationship between a time domain resource position at which the first signal is sent and a resource position at which the first message carrying the CP length information and/or the resource configuration information is sent remains the same. Therefore, the first communication apparatus may determine the at least one second time domain resource based on the length of the time interval. Further, the following describes two cases.

Case 1: The length of the time interval between the first time domain resource and each of the at least one second time domain resource is a positive-integer number of time domain resource units. To be specific, a position of the first time domain resource relative to a boundary of a first time domain unit is the same as a position of the second time domain resource relative to a boundary of a second time domain unit. The first time domain resource is located in the first time domain unit, and the second time domain resource is located in the second time domain unit.

Figure 4:
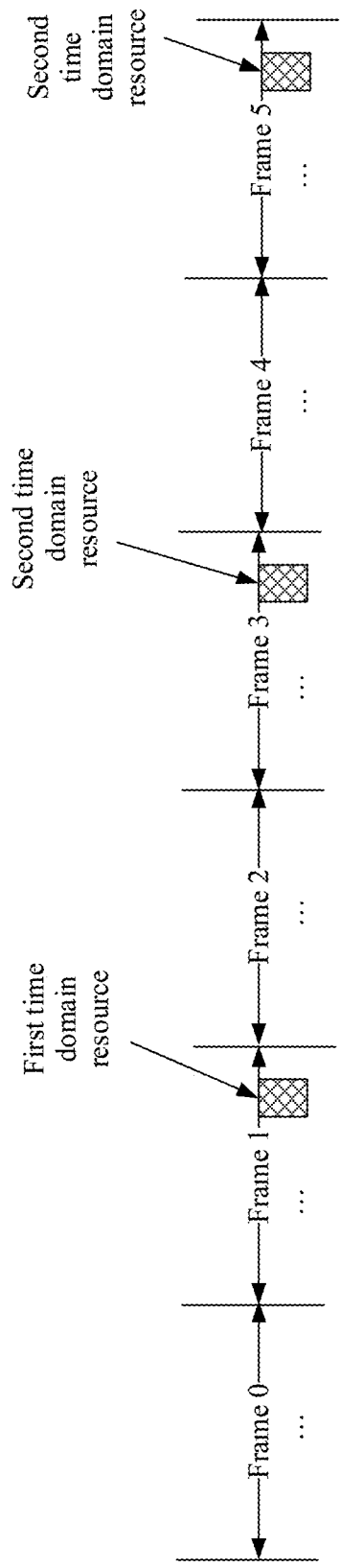
FIG. 4 is a schematic diagram of a frame structure according to an embodiment of this application.

For example, as shown in FIG. 4, a time domain resource unit is a frame. Structures of a frame 1, a frame 3, and a frame 5 are the same. Structures of a frame 0, a frame 2, and a frame 4 may be the same as or different from that of the frame 1, the frame 3, or the frame 5. For example, there is only one second time domain resource. The second communication apparatus may send the first signal on the first time domain resource in the frame 1, and send the first message on the second time domain resource in the frame 3. A length of a time interval between the first time domain resource and the second time domain resource is two frames. In other words, a position of the first time domain resource in the frame 1 relative to the left boundary (or the right boundary) of the frame 1 is the same as a position of the second time domain resource in the frame 3 relative to the left boundary (or the right boundary) of the frame 3. Herein, the frame 1 is a first time domain resource unit, the frame 3 is a second time domain resource unit.

In FIG. 4, for example, there are two second time domain resources. The second communication apparatus sends the first signal on the first time domain resource in the frame 1, and sends the first message on the second time domain resource in the frame 3 and on a second time domain resource in the frame 5. The length of the time interval between the first time domain resource in frame 1 and the second time domain resource in frame 3 is two frames, and a length of a time interval between the first time domain resource in frame 1 and the second time domain resource in frame 5 is four frames. In other words, the position of the first time domain resource in the frame 1 relative to the left boundary (or the right boundary) of the frame 1 is the same as the position of the second time domain resource in the frame 3 relative to the left boundary (or the right boundary) of the frame 3, and the position of the first time domain resource in the frame 1 relative to the left boundary (or the right boundary) of the frame 1 is the same as a position of the second time domain resource in the frame 5 relative to the left boundary (or the right boundary) of the frame 5. Herein, the frame 1 is the first time domain unit, the frame 3 and the frame 5 are second time domain resource units.

To describe case 1 more clearly, the following describes case 1 from three aspects with the time domain resource unit being frame.

Figure 5:
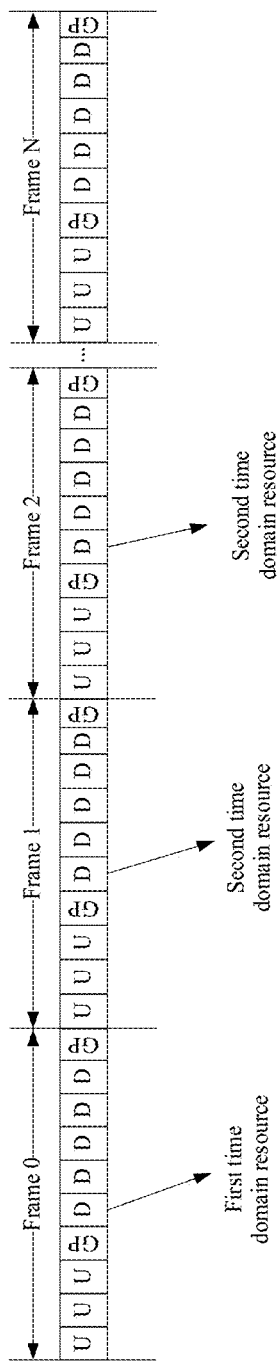
FIG. 5 is a schematic diagram of another frame structure according to an embodiment of this application.

If all frames have a same frame structure, the second communication apparatus sends the first signal and the first message at same time domain positions of two frames having a same frame structure. For example, as shown in FIG. 5, frame structures of a frame 0, a frame 1, ..., and a frame N are the same. The second communication apparatus may send the first signal on a first time domain resource in the frame 0. For example, there is only one second time domain resource, and the second communication apparatus may send the first message on the second time domain resource in the frame 1. In an implementation of this example, the frame 0 at which the first signal is sent and the frame 1 at which the first message is sent are separated by one frame. In another possible implementation, the frame at which the first signal is sent and the frame at which the first message is sent may alternatively be separated by a plurality of frames. This is not limited in this application. For another example, there are two second time domain resources. The second communication apparatus sends the first message on the second time domain resources in the frame 1 and the frame 2. The first time domain resource in the frame 0 and the second time domain resource in the frame 1 are separated by one frame, and the first time domain resource in the frame 0 and the second time domain resource in the frame 2 are separated by two frames. In this embodiment of this application, the frame at which the first signal is sent and the frame at which the first message is sent may alternatively be separated by frames in other quantities. This is not limited in this embodiment of this application.

Figure 6:
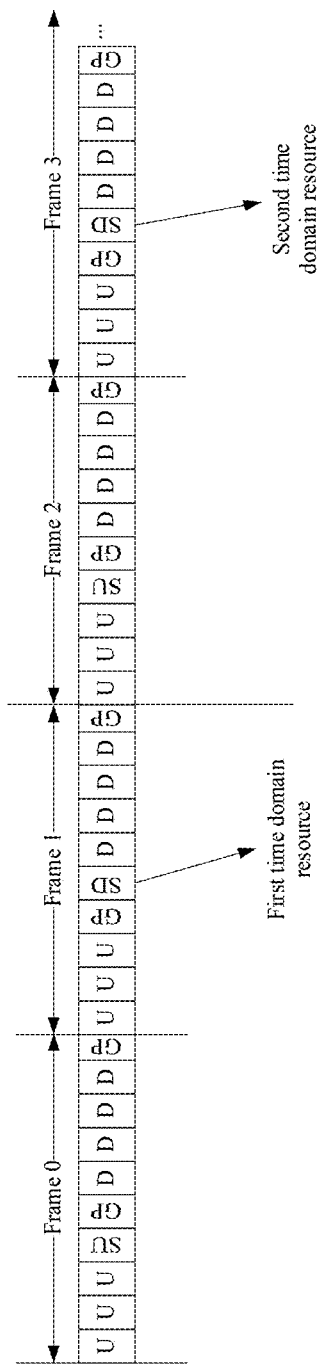
FIG. 6 is a schematic diagram of still another frame structure according to an embodiment of this application.

In the plurality of frames, some frames have a same frame structure, and some frames have different frame structures. The second communication apparatus sends the first signal and the first message in two frames having a same frame structure. As shown in FIG. 6, one second time domain resource is used as an example for description. A frame 0 and a frame 2 have a same frame structure, a frame 1 and a frame 3 have a same frame structure, and the frame structures of the frame 0 and the frame 1 are different. If both the frame 1 and the frame 3 include special downlink (SD) symbols, the second communication apparatus may send the first signal at a position of an SD symbol in the frame 1 (a first time domain resource), and send the first message at a position of an SD symbol in the frame 3 (a second time domain resource). If the frame 1 and the frame 3 do not include the SD symbols, the second communication apparatus may send the first signal at any symbol position to which a downlink symbol is mapped (the first time domain resource) in the frame 1, and send the first message at a downlink symbol that is in the frame 3 and whose position relative to the frame 3 is the same as the symbol position relative to the frame 1 (the second time domain resource).

In the plurality of frames, some frames have a same frame structure, some frames have different frame structures, some frames include SD symbols, and some frames do not include SD symbols. In this case, the second communication apparatus may send the first signal and the first message at any two time domain positions separated by an integer number of frames. The sending of the first signal and the first message is not limited to two time domain positions in frames having a same frame structure. In this case, the second communication apparatus may send the first signal at a first time domain position of a first frame, and send the first message at a first time domain location of a second frame. The first time domain position of the first frame and the first time domain position of the second frame are separated by a positive-integer number of frames. The first time domain position is a position of a D symbol instead of a position of an SD symbol. Optionally, the first time domain positions are positions adjacent to right boundaries of the first frame and the second frame.

In FIG. 5 and FIG. 6, D indicates that a symbol is a symbol used for downlink transmission, U indicates that a symbol is a symbol used for uplink transmission, SD indicates different symbols used for downlink transmission in frames of different frame structures, and SU indicates different symbols used for uplink transmission in frames of different frame structures. FIG. 6 is used as an example. The frame 0 and the frame 2 include only SD symbols and do not include SU symbols; and the frame 1 and the frame 3 include only SU symbols and do not include SD symbols.

It may be understood that the frame structures shown in FIG. 4 to FIG. 6 are merely examples for description, and should not constitute any limitation on this embodiment of this application.

Case 2: The length of the time interval between the first time domain resource and each of the at least one second time domain resource is fixed. To be specific, whether the first time domain resource on which the first signal is sent and each second time domain resource on which the first message is sent are in a same time domain resource unit or different time domain resource units, a length between the first time domain resource on which the first signal is sent and each second time domain resource on which the first message is sent is fixed, and does not change regardless of content included in the first message.

In either of the foregoing two cases, the length of the time interval between the first time domain resource and each of the at least one second time domain resource may be specified in a protocol, or may be indicated by the first signal. For example, the first signal indicates the length of the time interval between the first time domain resource and each of the at least one second time domain resource, and the first communication apparatus determines the at least one second time domain resource based on the length of the time interval indicated by the first signal and the first time domain resource on which the first signal is received.

It may be understood that a quantity of second time domain resources is the same as a quantity of time intervals between the first time domain resource and the at least one second time domain resource. For example, the second communication apparatus sends the first message to the first communication apparatus on one second time domain resource. In this case, there is one time interval between the first time domain resource and the second time domain resource. For another example, the second communication apparatus sends the first message to the first communication apparatus on two second time domain resources. In this case, there is one time interval between the first time domain resource and each of the two second time domain resources, and there are two time intervals in total.

S320 may be described from the perspective of the following three cases.

Case 1: The first message includes the CP length information. In this way, the first communication apparatus may determine the at least one second time domain resource based on the first time domain resource on which the first signal is received and the length of the time interval between the first time domain resource and the at least one second time domain resource, to receive the first message on the at least one second time domain resource. This can reduce overheads caused by blind detection required for obtaining the CP length information by the first communication apparatus. The resource configuration information for uplink transmission and downlink transmission may be obtained in another manner. For example, the first communication apparatus may determine, by blindly detecting scheduling signaling, resource configuration information in a system message scheduled by using the scheduling signaling.

In Case 1, a first field included in the first message may indicate the CP length information.

Case 2: The first message includes the resource configuration information for uplink transmission and downlink transmission. In this case, the first communication apparatus determines the at least one second time domain resource based on the first time domain resource on which the first signal is received and the length of the time interval between the first time domain resource and the at least one second time domain resource, to receive the first message on the at least one second time domain resource. This can reduce overheads caused by blind detection required for obtaining the resource configuration information by the first communication apparatus. The CP length information may be obtained in another manner. For example, the first communication apparatus may alternatively obtain the CP length information through blind detection, for example, determine the CP length information by blindly detecting an interval between a primary synchronization signal (PSS) and a secondary synchronization signal (SSS).

In Case 2, the first field included in the first message may indicate the resource configuration information for uplink transmission and downlink transmission.

Case 3: The first message includes the CP length information and the resource configuration information for uplink transmission and downlink transmission. In this case, the first communication apparatus determines the at least one second time domain resource based on the first time domain resource on which the first signal is received and the length of the time interval between the first time domain resource and the at least one second time domain resource, to receive the first message on the at least one second time domain resource. This can avoid blind detection required for obtaining the resource configuration information and the CP length information by the first communication apparatus, thereby reducing complexity of implementation.

In Case 3, the first field included in the first message may indicate the CP length information and the resource configuration information for uplink transmission and downlink transmission. For example, a value of the first field may be a value in a row in Table 1. In this way, both the CP length information and the resource configuration information can be indicated by the first field. Therefore, indication overheads can be reduced.

In the foregoing three cases, the first field included in the first message may be preset or specified in a protocol. This is not limited in this application.

In the foregoing three cases, preset correspondences exist between different values indicated by the first field and different pieces of CP length information and/or resource configuration information. An example in which preset correspondences exist between different values indicated by the first field and different pieces of CP length information and resource configuration information is used in the following descriptions. For example, the first field includes two bits, and a preset correspondence is shown in Table 1. In this case, the two bits are used to indicate three combination relationships between the CP length information and the resource configuration information. If two fields are used to indicate the CP length information and the resource configuration information respectively, one bit is required for two types of CP length information in Table 1, and two bits are required for three types of resource configuration information. In total, three bits are required to indicate the CP length information and the resource configuration information. Therefore, compared with indicating by using two bits, combined indication in Table 1 can save an overhead of one bit. Table 1 is merely an example for description, but should not constitute any limitation on this application. In Table 1, unidirectional device (UDD) indicates that one uplink symbol and two downlink symbols are configured, UUD indicates that two uplink symbols and one downlink symbol are configured, and UD indicates that one uplink symbol and one downlink symbol are configured.

TABLE 1

| Value of a first field | CP length information | Resource configuration information |
|---|---|---|
| 00 | CP length 1 (short CP) | Resource configuration 1 (UDD) |
| 01 | CP length 1 (short CP) | Resource configuration 2 (UUD) |
| 10 | CP length 2 (long CP) | Resource configuration 3 (UD) |

In this embodiment of this application, after S120, the first communication apparatus may determine the CP length based on the CP length information in the first message, and determine, based on the resource configuration information, resource configuration for uplink transmission and downlink transmission. The second communication apparatus sends downlink data and receives uplink data based on the CP length and the resource configuration information, and the first communication apparatus receives the downlink data and sends the uplink data based on the CP length and the resource configuration information. In this way, consistency between uplink transmission and downlink transmission can be ensured. This reduces complexity, and improves efficiency of detecting the CP length information and/or the resource configuration information by the first communication apparatus, thereby improving system performance.

Embodiments described in this specification may be independent solutions, or may be combined based on internal logic. All these solutions fall within the protection scope of this application.

It may be understood that the method and operations implemented by the first communication apparatus in the foregoing method embodiment may alternatively be implemented by a component (for example, a chip or a circuit) applicable to the first communication apparatus, and the method and operations implemented by the second communication apparatus in the foregoing method embodiment may alternatively be implemented by a component (for example, a chip or a circuit) applicable to the second communication apparatus.

The foregoing describes the method embodiment provided in this application, and the following describes apparatus embodiments provided in this application. It should be understood that description of the apparatus embodiments corresponds to the description of the method embodiments. Therefore, for content that is not described in detail, refer to the foregoing method embodiments. For brevity, details are not described herein again.

The foregoing mainly describes the solutions provided in embodiments of this application from a perspective of interaction between two communication apparatuses. It may be understood that, to implement the foregoing functions, each communication apparatus, for example, a transmit end device or a receive end device, includes a corresponding hardware structure and/or software module for implementing each function. A person skilled in the art may be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the protection scope of this application.

In embodiments of this application, the transmit end device or the receive end device may be divided into functional modules based on the foregoing method examples. For example, the transmit end device or the receive end device may be divided into functional modules based on corresponding functions, or two or more functions may be integrated into one processing module. The integrated module may be implemented in a form of hardware, or may be implemented in a form of a software functional module. It should be noted that, in embodiments of this application, division into the modules is an example, and is merely logical function division. During actual implementation, another division manner may be used. An example in which functional modules are divided based on corresponding functions is used below for description.

Figure 7:
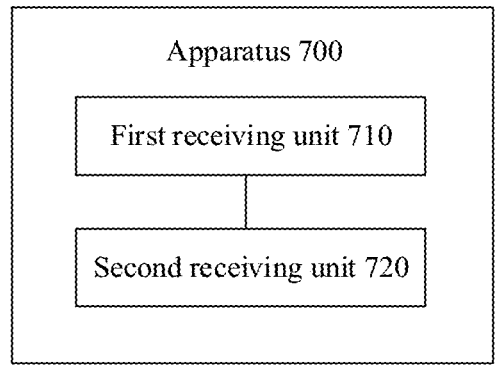
FIG. 7 is a schematic block diagram of a communication apparatus according to an embodiment of this application.

FIG. 7 is a schematic block diagram of a communication apparatus 700 according to an embodiment of this application. The communication apparatus 700 includes a first receiving unit 710 and a second receiving unit 720. The first receiving unit 710 and the second receiving unit 720 may communicate with external devices. The first receiving unit 710 and the second receiving unit 720 may alternatively be referred to as communication interface or communication unit.

Optionally, the apparatus 700 may further include a processing unit. The processing unit is configured to perform data processing, and the processing unit is configured to perform an operation related to processing on a first communication apparatus side in the foregoing method embodiment.

The apparatus 700 may be configured to perform an operation performed by the first communication apparatus in the foregoing method embodiment. The first receiving unit 710 and the second receiving unit 720 are configured to perform receiving-related operations on the first communication apparatus side in the foregoing method embodiment.

The first receiving unit 710 is configured to receive a first signal on a first time domain resource, where the first signal is used for synchronization. The second receiving unit 720 is configured to receive a first message on at least one second time domain resource, where the first message includes cyclic prefix length information and/or resource configuration information for uplink transmission and downlink transmission.

A length of a time interval between the first time domain resource and each of the at least one second time domain resource is a positive-integer number of time domain resource units.

In an optional embodiment, the first message includes a first field, and the first field indicates the cyclic prefix length information, or the first field indicates the resource configuration information, or the first field indicates the cyclic prefix length information and the resource configuration information.

In an optional embodiment, preset correspondences exist between different values indicated by the first field and different pieces of cyclic prefix length information and/or resource configuration information.

In an optional embodiment, the first signal is further used to indicate a length of a time interval between the first time domain resource and the at least one second time domain resource.

In an optional embodiment, the first message is a broadcast message.

In an optional embodiment, the broadcast message is a system message.

The apparatus 700 in this embodiment of this application may correspondingly perform the method described in embodiments of this application. In addition, the foregoing and other operations and/or functions of the units in the apparatus 700 are used to implement corresponding procedures of the method. For brevity, details are not described herein again.

Figure 8:
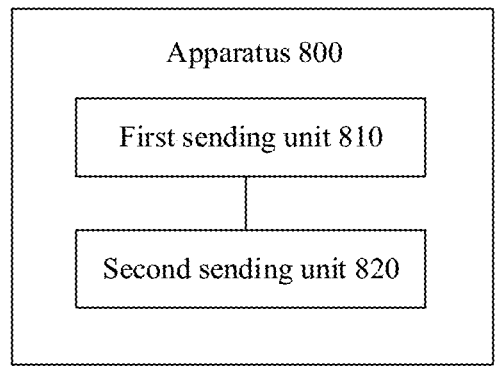
FIG. 8 is a schematic block diagram of another communication apparatus according to an embodiment of this application.

FIG. 8 is a schematic block diagram of a communication apparatus 800 according to an embodiment of this application. The communication apparatus 800 includes a first sending unit 810 and a second sending unit 820. The first sending unit 810 and the second sending unit 820 may communicate with external devices. The first sending unit 810 and the second sending unit 820 may alternatively be referred to as communication interface or communication unit.

Optionally, the apparatus 800 may further include a processing unit. The processing unit is configured to perform data processing, and the processing unit is configured to perform an operation related to processing on a second communication apparatus side in the foregoing method embodiment.

The apparatus 800 may be configured to perform an operation performed by the second communication apparatus in the foregoing method embodiment. The first sending unit 810 and the second sending unit 820 are configured to perform receiving-related operations on the second communication apparatus side in the foregoing method embodiment.

The first sending unit 810 is configured to send a first signal on a first time domain resource, where the first signal is used for synchronization. The second sending unit 810 is configured to send a first message on at least one second time domain resource, where the first message includes cyclic prefix length information and/or resource configuration information for uplink transmission and downlink transmission.

A length of a time interval between the first time domain resource and each of the at least one second time domain resource is a positive-integer number of time domain resource units.

In an optional embodiment, the first message includes a first field, and the first field indicates the cyclic prefix length information, or the first field indicates the resource configuration information, or the first field indicates the cyclic prefix length information and the resource configuration information.

In an optional embodiment, preset correspondences exist between different values indicated by the first field and different pieces of cyclic prefix length information and/or resource configuration information.

In an optional embodiment, the first signal is further used to indicate a length of a time interval between the first time domain resource and the at least one second time domain resource.

The first message is a broadcast message. In an optional embodiment, the broadcast message is a system message.

The apparatus 800 in this embodiment of this application may correspondingly perform the method described in embodiments of this application. In addition, the foregoing and other operations and/or functions of the units in the apparatus 800 are used to implement corresponding procedures of the method. For brevity, details are not described herein again.

Figure 9:
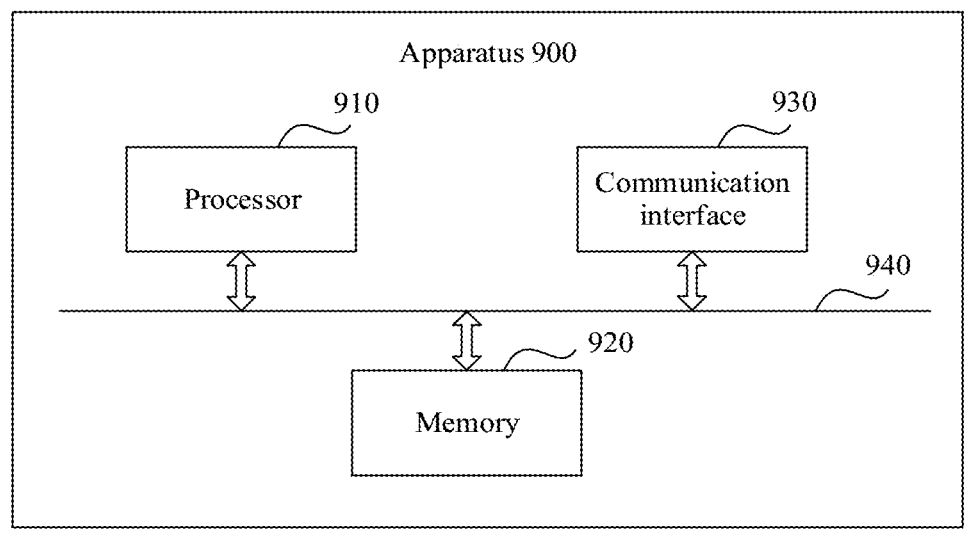
FIG. 9 is a schematic block diagram of still another communication apparatus according to an embodiment of this application.

FIG. 9 is a schematic diagram of a structure of a communication apparatus 900 according to an embodiment of this application. The communication apparatus 900 includes a processor 910, a memory 920, a communication interface 930, and a bus 940.

In a possible implementation, the processor 910 in the apparatus 900 shown in FIG. 9 may correspond to the processing unit in the apparatus 700 in FIG. 7. The communication interface 930 in the apparatus 900 shown in FIG. 9 may correspond to the first receiving unit 710 and the second receiving unit 720 in the apparatus 700 in FIG. 7.

In a possible implementation, the processor 910 in the apparatus 900 shown in FIG. 9 may correspond to the processing unit in the apparatus 800 in FIG. 8. The communication interface 930 in the apparatus 900 shown in FIG. 9 may correspond to the first sending unit 810 and the second sending unit 820 in the apparatus 800 in FIG. 8.

The processor 910 may be connected to the memory 920. The memory 920 may be configured to store program code and data. Therefore, the memory 920 may be a storage unit in the processor 910, an external storage unit independent of the processor 910, or a component including the storage unit in the processor 910 and the external storage unit independent of the processor 910.

Optionally, the apparatus 900 may further include a bus 940. The memory 920 and the communication interface 930 may be connected to the processor 910 by using the bus 940. The bus 940 may be a peripheral component interconnect (PCI) bus, an extended industry standard architecture (EISA) bus, or the like. The bus 940 may be categorized as an address bus, a data bus, a control bus, or the like. For ease of indication, the bus is indicated by only one line in FIG. 9. However, it does not indicate that there is only one bus or only one type of bus.

It should be understood that in this embodiment of this application, the processor 910 may be a central processing unit (CPU). The processor may alternatively be a general-purpose processor, a digital signal processor (DSP), an application specific integrated circuit (ASIC), a field-programmable gate array (FPGA) or another programmable logic device, discrete gate or transistor logic device, discrete hardware component, or the like. The general-purpose processor may be a microprocessor, or the processor may be any conventional processor or the like. Alternatively, the processor 810 is configured to execute a related program by using one or more integrated circuits, to implement technical solutions provided in embodiments of this application.

The memory 920 may include a read-only memory and a random access memory, and provides an instruction and data to the processor 910. A part of the processor 910 may further include a non-volatile random access memory. For example, the processor 910 may further store device type information.

When the apparatus 900 runs, the processor 910 executes computer-executable instructions in the memory 920 to perform the operation steps of the method via the apparatus 800.

It should be understood that the apparatus 900 according to an embodiment of this application may correspond to the apparatus 700 and the apparatus 800 in embodiments of this application, and the foregoing and other operations and/or functions of the units in the apparatus 700 and the apparatus 800 are intended to implement corresponding procedures in the method. For brevity, details are not described herein again.

Optionally, in some embodiments, an embodiment of this application further provides a computer-readable medium. The computer-readable medium stores program code. When the computer program code is run on a computer, the computer is enabled to perform the method in the foregoing aspects.

Optionally, in some embodiments, an embodiment of this application further provides a computer program product. The computer program product includes computer program code. When the computer program code is run on a computer, the computer is enabled to perform the method in the foregoing aspects.

In embodiments of this application, the terminal device or the network device includes a hardware layer, an operating system layer running above the hardware layer, and an application layer running above an operating system layer. The hardware layer may include hardware such as a CPU, a memory management unit (MMU), and a memory (also referred to as a primary memory). An operating system at the operating system layer may be any one or more computer operating systems that implement service processing through a process , for example, a Linux operating system, a Unix operating system, an Android operating system, an IDevice Operating System (iOS) operating system, or a Windows operating system. The application layer may include applications such as a browser, an address book, word processing software, and instant messaging software.

A specific structure of an execution entity of the method provided in embodiments of this application is not limited in embodiments of this application, provided that the execution entity can execute a program that records code of the method provided in embodiments of this application, to perform communication according to the method provided in embodiments of this application. For example, the execution body of the method provided in embodiments of this application may be a terminal device or a network device, or a functional module that is in the terminal device or the network device and that can invoke and execute a program.

Aspects or features in embodiments of this application may be implemented as a method, an apparatus, or a product that uses standard programming and/or engineering technologies. The term "product" used in this specification may cover a computer program that is accessible from any computer-readable device, carrier, or medium. For example, a computer-readable medium may include but is not limited to: a magnetic storage device (for example, a hard disk drive, a floppy disk, or a magnetic tape), an optical disc (for example, a compact disc (CD), a digital versatile disc (DVD)), a smart card, and a flash memory (for example, an erasable programmable read-only memory (EPROM), a card, a stick, or a key drive).

Various storage media described in this specification may indicate one or more devices and/or other machine-readable media that are configured to store information. The term "machine-readable media" may include but is not limited to a radio channel and various other media that can store, include, and/or carry instructions and/or data.

It should be understood that the processor mentioned in embodiments of this application may be a CPU, or the processor may be another general-purpose processor, a DSP, an ASIC, an FPGA or another programmable logic device, a discrete gate or transistor logic device, a discrete hardware component, or the like. The general-purpose processor may be a microprocessor, or the processor may be any conventional processor or the like.

It may be further understood that the memory mentioned in embodiments of this application may be a volatile memory or a nonvolatile memory, or may include a volatile memory and a nonvolatile memory. The non-volatile memory may be a read-only memory (ROM), a programmable ROM (PROM), an EPROM, an electrically EPROM (EEPROM), or a flash memory. The volatile memory may be a random-access memory (RAM). For example, the RAM may be used as an external cache. By way of example, and not limitation, the RAM may include the following plurality of forms: a static RAM (SRAM), a dynamic RAM (DRAM), a synchronous DRAM (SDRAM), a double data rate (DDR) SDRAM , an enhanced SDRAM (ESDRAM), a synchlink DRAM (SLDRAM), and a direct rambus (DR) RAM.

It should be noted that when the processor is a general-purpose processor, a DSP, an ASIC, an FPGA or another programmable logic device, a discrete gate or a transistor logic device, or a discrete hardware component, the memory (a storage module) may be integrated into the processor.

It should be further noted that the memory described in this specification is intended to include, but is not limited to, these memories and any memory of another proper type.

A person of ordinary skill in the art may be aware that, in combination with the examples described in embodiments disclosed in this specification, units and steps may be implemented by electronic hardware or a combination of computer software and electronic hardware. Whether the functions are implemented by hardware or software depends on particular applications and design constraints of the technical solutions. A person skilled in the art may use different methods to implement the described functions for each particular application, but it should not be considered that the implementation goes beyond the protection scope of this application.

It may be clearly understood by a person skilled in the art that, for the purpose of convenient and brief description, for a detailed working process of the foregoing system, apparatus, and unit, reference should be made to the corresponding process in the foregoing method embodiment, and details are not described herein again.

In several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. The parts displayed as units may or may not be physical units, and may be located in one position, or may be distributed on a plurality of network units. Some or all of the units may be selected based on actual requirements to achieve the objectives of the solutions of the embodiments.

In addition, functional units in embodiments of this application may be integrated into one unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a computer software product. The computer software product is stored in a storage medium, and the computer software product includes several instructions. The instructions are used to instructing a computer device (which may be a personal computer, a server, a network device, or the like) to perform all or some of the steps of the method described in embodiments of this application. The foregoing storage medium may include but is not limited to any medium that can store program code, such as a USB flash drive, a removable hard disk, a ROM, a RAM, a magnetic disk, or an optical disc.

Unless otherwise defined, all technical and scientific terms used in this specification have same meanings as those usually understood by a person skilled in the art of this application. The terms used in the specification of this application are merely for the purpose of describing specific embodiments, and are not intended to limit this application.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method comprising:
   receiving, on a first time domain resource, a first signal for synchronization; and
   receiving, on at least one second time domain resource, a first message comprising cyclic prefix length information and resource configuration information for uplink transmission and downlink transmission,
   wherein the resource configuration information indicates an index of a ratio of a first quantity of resources for uplink transmission and a second quantity of resources for downlink transmission,
   wherein a length of a time interval between the first time domain resource and each of the at least one second time domain resource is a positive-integer number of time domain resource units, and
   wherein a length of the time domain resource units is fixed regardless of changes of the cyclic prefix length information and the resource configuration information for uplink transmission and downlink transmission.

2. The communication method of claim 1, wherein the first message comprises a first field indicating the cyclic prefix length information and a second field indicating the resource configuration information.

3. The communication method of claim 1, wherein the time domain resource units are frames.

4. The communication method of claim 3, wherein a first position of the first time domain resource in a first frame relative to a first left boundary or a first right boundary of the first frame is the same as a second position of each of the at least one second time domain resource in a second frame relative to a second left boundary or a second right boundary of the second frame.

5. The communication method of claim 1, wherein the first message comprises a first field indicating the cyclic prefix length information, the resource configuration information, or both the cyclic prefix length information and the resource configuration information.

6. The communication method of claim 1, wherein the first signal indicates the length of the time interval.

7. The communication method of claim 1, wherein the first message is a broadcast message.

8. The communication method of claim 7, wherein the broadcast message is a system message.

9. The communication method of claim 1, wherein the resource configuration information further indicates first positions of the resources for uplink transmission and second positions of the resources for downlink transmission.

10. A communication method comprising:
    sending, on a first time domain resource, a first signal for synchronization; and
    sending, on at least one second time domain resource, a first message comprising cyclic prefix length information and resource configuration information for uplink transmission and downlink transmission,
    wherein the resource configuration information indicates an index of a ratio of a first quantity of resources for uplink transmission and a second quantity of resources for downlink transmission,
    wherein a length of a time interval between the first time domain resource and each of the at least one second time domain resource is a positive-integer number of time domain resource units, and
    wherein a length of the time domain resource units is fixed regardless of changes of the cyclic prefix length information and the resource configuration information for the uplink transmission and downlink transmission.

11. The communication method of claim 10, wherein the first message comprises a first field indicating the cyclic prefix length information and a second field indicating the resource configuration information.

12. The communication method of claim 10, wherein the time domain resource units are frames.

13. The communication method of claim 12, wherein a first position of the first time domain resource in a first frame relative to a first left boundary or a first right boundary of the first frame is the same as a second position of each of the at least one second time domain resource in a second frame relative to a second left boundary or a second right boundary of the second frame.

14. The communication method of claim 10, wherein the first message comprises a first field indicating the cyclic prefix length information, the resource configuration information, or both the cyclic prefix length information and the resource configuration information.

15. The communication method of claim 10, wherein the first signal indicates the length of the time interval.

16. The communication method of claim 10, wherein the first message is a broadcast message.

17. The communication method of claim 16, wherein the broadcast message is a system message.

18. A communication apparatus comprising:
    a memory configured to store instructions; and one or more processors coupled to the memory and configured execute the instructions to cause the communication apparatus to:
receive, on a first time domain resource, a first signal for synchronization; and
receive, on at least one second time domain resource, a first message comprising cyclic prefix length information and resource configuration information for uplink transmission and downlink transmission,
wherein the resource configuration information indicates an index of a ratio of a first quantity of resources for uplink transmission and a second quantity of resources for downlink transmission,
wherein a length of a time interval between the first time domain resource and each of the at least one second time domain resource is a positive-integer number of time domain resource units, and
wherein a length of the time domain resource units is fixed regardless of changes of the cyclic prefix length information and the resource configuration information for uplink and downlink transmission.

19. The communication apparatus of claim 18, wherein the first message comprises a first field indicating the cyclic prefix length information and a second field indicating resource configuration information.

20. The communication apparatus of claim 18, wherein the time domain resource units are frames.

21. The communication apparatus of claim 20, wherein a first position of the first time domain resource in a first frame relative to a first left boundary or a first right boundary of the first frame is the same as a second position of each of the at least one second time domain resource in a second frame relative to a second left boundary or a second right boundary of the second frame.

22. The communication apparatus of claim 18, wherein the first message comprises a first field indicating the cyclic prefix length information, the resource configuration information, or both the cyclic prefix length information and the resource configuration information.

23. The communication apparatus of claim 18, wherein the first signal indicates the length of the time interval.

24. The communication apparatus of claim 18, wherein the first message is a broadcast message.

25. A communication apparatus comprising:
a memory configured to store instructions; and
one or more processors coupled to the memory and configured to execute the instructions to cause the communication apparatus to:
send, on a first time domain resource, a first signal for synchronization; and
send, on at least one second time domain resource, a first message comprising cyclic prefix length information and resource configuration information for uplink transmission and downlink transmission,
wherein the resource configuration information indicates an index of a ratio of a first quantity of resources for uplink transmission and a second quantity of resources for downlink transmission,
wherein a length of a time interval between the first time domain resource and each of the at least one second time domain resource is a positive-integer number of time domain resource units, and
wherein a length of the time domain resource units is fixed regardless of changes of the cyclic prefix length information and the resource configuration information for uplink transmission and downlink transmission.

26. The communication apparatus of claim 25, wherein the first message comprises a first field indicating the cyclic prefix length information and a second field indicating resource configuration information.

27. The communication apparatus of claim 25, wherein the time domain resource units are frames.

28. The communication apparatus of claim 27, wherein a first position of the first time domain resource in a first frame relative to a first left boundary or a second right boundary of the first frame is the same as a second position of each of the at least one second time domain resource in a second frame relative to a second left boundary or a second right boundary of the second frame.

29. The communication apparatus of claim 25, wherein the first message comprises a first field indicating the cyclic prefix length information, the resource configuration information, or both the cyclic prefix length information and the resource configuration information.

30. The communication apparatus of claim 25, wherein the first signal indicates the length of the time interval.

31. The communication apparatus of claim 25, wherein the first message is a broadcast message.

32. A communication system comprising:
a second communication apparatus configured to:
send, on a first time domain resource, a first signal for synchronization; and
send, on at least one second time domain resource, a first message comprising cyclic prefix length information and resource configuration information for uplink transmission and downlink transmission, wherein the resource configuration information indicates an index of a ratio of a first quantity of resources for uplink transmission and a second quantity of resources for downlink transmission, wherein a length of a time interval between the first time domain resource and each of the at least one second time domain resource is a positive-integer number of time domain resource units, and
wherein a length of the time domain resource units is fixed regardless of changes of the cyclic prefix length information and the resource configuration information for uplink transmission and downlink transmission; and
a first communication apparatus configured to:
receive, on the first time domain resource, the first signal; and
receive, on the least one second time domain resource, the first message.

* * * * *